Feb. 22, 1966  O. M. BAYCURA ET AL  3,237,126
INVERTER POWER SUPPLY

Filed Dec. 18, 1961

INVENTORS
ORESTES M. BAYCURA
DAVID A. ROSENDAHL

BY Francis V. Giolma
ATTORNEY

Feb. 22, 1966   O. M. BAYCURA ET AL   3,237,126
INVERTER POWER SUPPLY
Filed Dec. 18, 1961
3 Sheets-Sheet 3

United States Patent Office 3,237,126
Patented Feb. 22, 1966

3,237,126
INVERTER POWER SUPPLY
Orestes M. Baycura and David A. Rosendahl, Irwin, Pa., assignors to International Business Machines Corporation, New York, N.Y., a corporation of New York
Filed Dec. 18, 1961, Ser. No. 159,992
9 Claims. (Cl. 331—113)

This invention relates generally to inverters and it has reference in particular to a magnetic type inverter for producing substantially square alternating waves from a direct current source.

More specifically, it is an object of this invention to provide a compact and inexpensive power supply for computers and the like.

One object of the invention is to provide a reliable high frequency square wave generator power supply.

Another object of the invention is to provide an internally triggered inverter that is positive and accurate in its operation.

Yet another object of the invention is to provide for materially reducing the switching time of a core in a magnetic multivibrator type inverter.

It is also an object of this invention to provide for using internal triggering of silicon controlled rectifiers in a magnetic multivibrator type inverter.

Yet another important object of this invention is to provide for positive starting of an internally triggered controlled rectifier inverter.

It is also an important object of this invention to provide for using a frequency sensitive control circuit for controlling the bias of magnetic cores in a magnetic multivibrator type converter so as to establish an accurate output frequency for the inverter.

Yet another important object of this invention is to provide a temperature sensitive control of the output frequency of a magnetic multivibrator type inverter.

A further object of this invention is to provide for using capacitors for producing trigger pulses in an internal trigger circuit for a magnetic multivibrator type inverter.

In a preferred embodiment of the invention, a pair of magnetic cores of substantially rectangular hysteresis loop material have main windings which are alternately connected to a direct current source for driving the cores to saturation in opposite senses. Trigger windings on the cores and capacitors are used to apply triggering pulses to the control electrodes of the respective rectifiers to selectively render them conductive. A frquency sensitive control circuit controls the energization of bias windings on the cores so that each operates in an opposite variable minor loop to regulate the frequency of switching. A reset winding is energized prior to completing the circuit to the controlled rectifiers to insure the correct residual polarity of the cores, and a start circuit is connected to one of the rectifier devices for insuring positive operation of the inverter during starting.

The foregoing and other objects, features and advantages of the invention will be apparent from the following more particular description of preferred embodiments of the invention, as illustrated in the accompanying drawings.

In the drawings:
FIG. 1 is a schematic circuit diagram of a magnetic type multivibrator embodying the invention in one of its forms.

Figure 1:
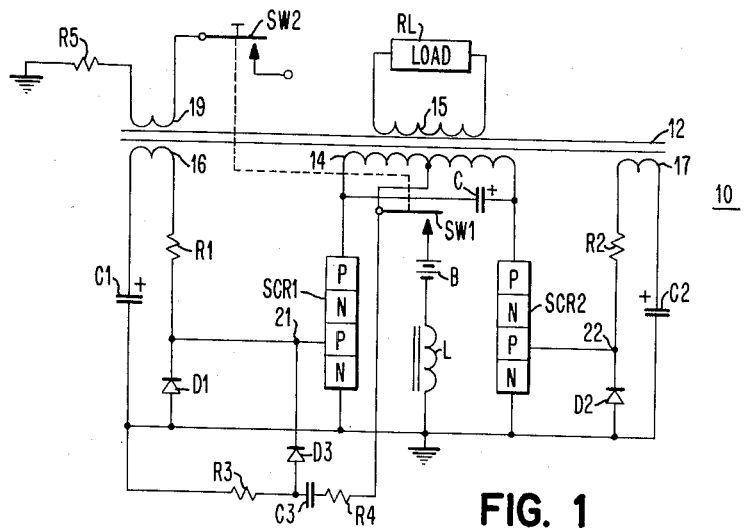

Referring particularly to FIG. 1, the reference numeral 10 denotes generally a magnetic multivibrator type inverter in which a magnetic core structure 12 of substantially rectangular hysteresis loop material for operation in a saturated mode is shown schematically as provided with a plurality of windings including a center tap input winding 14, an output winding 15 connected to a load RL, a pair of trigger windings 16 and 17 and a reset winding 19.

The two halves of the input winding 14 are connected to a direct source such as a battery B by means of silicon controlled rectifier devices SCR1 and SCR2 and a control switch SW1 connected to the center tap so as to provide for alternately energizing the opposite halves of the winding 14 to drive the core 12 towards saturation in opposite directions when switch SW1 is closed. An inductance device L is connected in series circuit relation with the battery B and the emitters of the silicon controlled rectifiers so as to act as a ballast to prevent excessive current flow during switching and prevent the currrent from the battery from dropping to zero during normal operation. A commutating capacitor C is connected across the terminals of the winding 14 so as to maintain a reverse bias across the silicon controlled rectifiers long enough to enable them to recover to the blocking state during the switching operation.

Integral triggering of the silicon controlled rectifiers SCR1 and SCR2 is obtained by connecting the base electrode terminals 21 and 22 to the trigger windings 16 and 17, respectively, in series circuit relation with trigger capacitors C1 and C2 and resistors R1 and R2, respectively. Blocking diodes D1 and D2 are used in conjunction with the silicon controlled rectifiers SCR1 and SCR2, respectively, to produce discharge of either C1 and C2 into the proper SCR when core 12 saturates. The reset winding 19 is connected through a current limiting resistor R5 to the source B by a start switch SW2 which is operably connected with switch SW1 to provide for momentary energization of the winding 19 before the source B is connected to the winding 14. A starting circuit including a capacitor C3 and divider resistors R3, R4 is connected through the switch SW1 and a diode D3 to the base terminal 21 of the silicon controlled rectifier SCR1 for effecting triggering or firing of the silicon controlled rectifier to render is conductive when the switch SW1 is closed.

Basically, the direct current supply voltage from the source B is transformed into a high frequency square wave alternating current output voltage at output winding 15 by the chopping action of the self-excited silicon controlled rectifiers SCR1 and SCR2 and the magnetic switching core 12 which is operated in the saturated mode. The energy storage capabilities of the capacitor C and the inductance device L are utilized to alternately turn off the silicon controlled rectifiers after firing.

The operation of the inverter is briefly as follows. The switch SW2 is closed momentarily, causing a reset current pulse to flow through the start winding 19 and resistor R5 to insure that the residual magnetism in the core 12 is in the desired direction, which is opposite to that produced by the initial energization of winding 14. The switch SW1 is then closed and the charging current from the capacitor C3 causes a starting pulse to be supplied to the base terminal 21 of the silicon controlled rectifier SCR1 through diode D3 so as to render SCR1 conductive. Current flows from the battery B through the switch SW1, inductance device L, the left-hand half of the winding 14, the silicon controlled rectifier SCR1, and back to the negative terminal of the battery through the inductance L causing the core 12 to be driven towards saturation in that one direction. As current is drawn through the left-hand half of the winding 14, the auto transformer action of the switching core charges the commutating capacitor C to the polarity shown. Capacitor C2 is charged through diode D2 by current which flows in the firing circuit of the silicon controlled rectifier SCR2 due to the inductive coupling of winding 17 with the winding 14. When the core 12 reaches saturation one half of the period of the output voltage will have been developed across the output winding 15.

The capacitor C2 now discharges through the winding 17 which presents a low impedance, and through the base and emitter electrodes of the silicon controlled rectifier SCR2 so that the rectifier SCR2 is caused to conduct. The commutating capacitor C discharges through the silicon controlled rectifier SCR2 and this shunting action reduces the forward current through the rectifier SCR1 and the inverse voltage developed causes the rectifier SCR1 to cease conduction. The inductance L limits the current long enough to insure that the rectifier SCR1 is turned off and assures that current is drawn continuously and relatively constantly from the supply source B.

Current flows from the battery source B through the right-hand half of the input winding 14, the silicon controlled rectifier SCR2 and inductance L back to the negative terminal of the source driving the core 12 to saturation in the opposite direction. The induced voltage across the trigger winding 16 causes the capacitor C1 to charge through D1 to the polarity shown. When the core 12 reaches saturation a full cycle of output voltage will have been developed across the output or load circuit winding 15. The capacitor C1 then discharges through the base-emitter circuit of the silicon controlled rectifier SCR1 which is triggered to conduct and a second cycle of operation begins. The frequency and magnitude of the output voltage are proportional to both the magnitudes of the source voltage B and to the load impedance.

In one embodiment of the invention, although a single core can be used, the core structure 12 comprised a pair of toroids two inches inside diameter and a three and one-half inches outside diameter wound from a magnetic tape material such as a 50–50 nickel iron composition one mil thick and one-half inch wide. The input winding 14 comprised 13 turns in each half of #20 conductor while the trigger windings each comprised four turns. The start winding comprises 30 turns and the output winding 15, 23 turns of #13 conductor. The silicon controlled rectifiers SCR1 and SCR2 were type SC35 BX General Electric silicon controlled rectifiers, capacitors C1 and C2 were each .047 microfarad, capacitor C was on the order of 2 microfarads, the inductance L 1 millihenry, and the starting capacitor C3 .01 microfard. Resistors R1 and R2 were each 27 ohms; R3, 10,000 ohms; R4, 200 ohms; and R5, 270 ohms. The voltage of source B was approximately 33 volts. This power supply produced a substantially square-wave output with a frequency of approximately 2.5 kilocycles.

Figure 2:
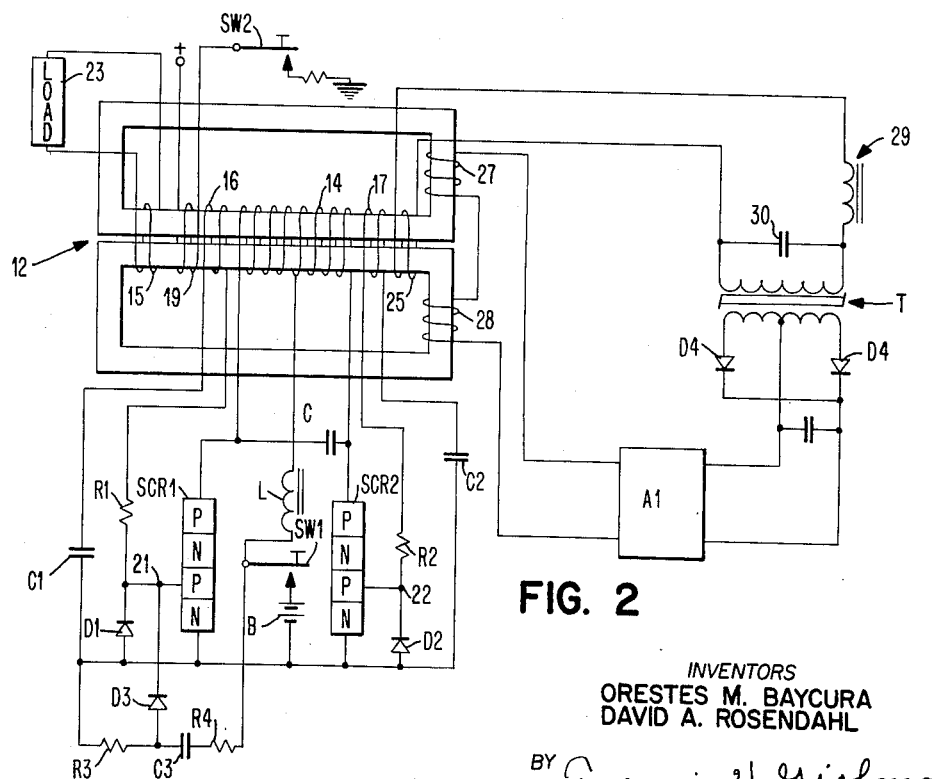
FIG. 2 is a schematic diagram showing a power supply embodying the invention in a different form.

Referring to FIG. 2, the reference numeral 12 denotes generally a magnetic core structure comprising either a combination of U and I ferrite bars, or a pair of toroidal cores such as described in connection with the inverter of FIG. 1, having a plurality of common windings including an input winding 14 which is center-tapped, trigger windings 16 and 17, output winding 15 shown connected to an output or load circuit 23, and a control winding 25. The input winding 14 is connected as described as hereinbefore to a D.C. source such as a battery B through a switch SW1 and an inductance device L by means of silicon controlled rectifiers SCR1 and SCR2. A commutating capacitor C is connected across the winding 14. Reset winding 19 is connected to the source through a switch SW2 for determining the residual flux in the core 12. The trigger windings 16 and 17 are likewise connected in circuit with capacitors C1 and C2, resistors R1 and R2 and diodes D1 and D2 to the base terminals 21 and 22 of rectifiers SCR1 and SCR2, respectively. A starting circuit including resistors R3, R4 and a capacitor C3 together with a diode D3 is connected to the base electrode terminal 21 of the silicon controlled rectifier SCR1, for initiating conduction of this silicon controlled rectifier.

In order to regulate the switching frequency of the magnetic core structure 12, bias windings 27 and 28 are provided on the two core sections which are arranged to bias the two core sections in opposite directions, being connected to the output of a direct current amplifier A1 which is controlled from a control winding 25, common to the cores through a frequency sensitive control circuit comprising a two piece ferroresonant transformer including a linear inductance device 29, transformer T, and a capacitor 30. The output of the frequency sensitive circuit 29–30 is rectified and connected to the amplifier A1 by rectifying diodes D4 so as to provide a variable bias energization of the windings 27 and 28 to vary the areas of the minor loop operating excursions of the fluxes in each of the core sections and hence, the switching period and the frequency of switching of the core sections.

Operation of the inverter shown in FIG. 2 is substantially identical with that described in connection with the inverter of FIG. 1. The start switch SW2 is momentarily closed to energize the reset winding 19, and determine the polarity of the residual flux in cores 12 prior to closing of the switch SW1 to connect the silicon controlled rectifiers SCR1 and SCR2 to the two halves of the input winding 14. The start circuit including the capacitor C3 provides an initiating pulse for the base electrode 21 of the silicon controlled rectifier SCR1 to insure it being rendered conductive initially. Conduction of the rectifier SCR1 draws current from the battery B and drives the cores 12 towards saturation in one sense. Switching of the cores takes place substantially as described in connection with the operation of the inverter shown in FIG. 1, one core being driven to saturation in the positive direction while the other is being reset, and then the other is driven to saturation in the negative direction while the first is reset so as to provide a substantially square wave output from the output winding 15 which is applied to the load circuit 23.

Since the circuit including the inductance 29 and the capacitor 30 is sensitive to changes in frequency, any change in frequency of the switching of the cores 12 changes the voltage applied to the transformer T and hence the voltage applied to the amplifier A1, which correspondingly varies the energization of the bias windings 27 and 28 so as to vary the minor loop excursions of the two core sections and hence switching time, so as to regulate and maintain a substantially constant frequency of operation. The output of such a frequency regulated inverter could be utilized to drive a ferroresonant regulator and thus overcome the frequency sensitivity of such type of regulator.

Figure 3:
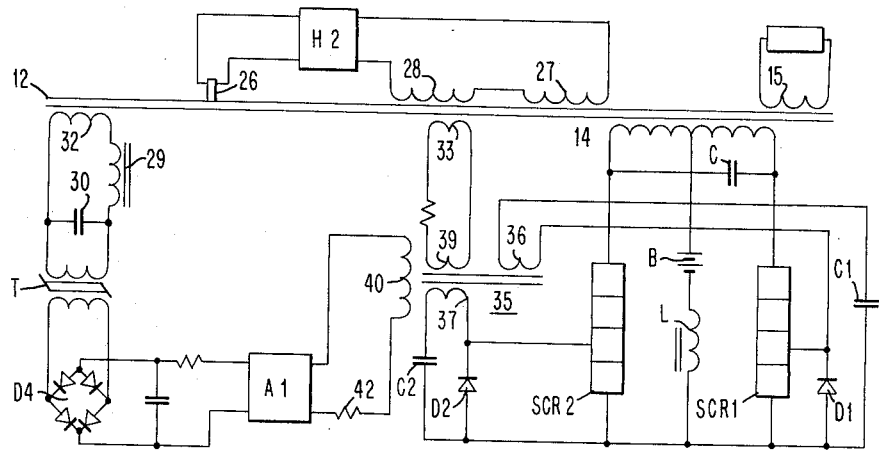
FIG. 3 is a schematic circuit diagram of a power supply embodying the invention in yet another form.

Referring to FIG. 3, the reference numeral 12 designates a magnetic core structure having a plurality of windings thereon including at least an input winding 14, an output winding 15, temperature variation bias control windings 27, 28 and an excitation winding 33, for supplying triggering energy, in addition to a control winding 32. The input winding 14 is shown connected by silicon controlled rectifiers SCR1 and SCR2 to a source of voltage such as a battery B through an inductance L in a manner similar to that described in connection with the inverters of FIG. 1 and FIG. 2. Control of the silicon controlled rectifiers SCR1 and SCR2 instead of being obtained by individual trigger windings 16 and 17 as described in connection with the inverters of FIGS. 1 and 2 is effected by means of a trigger control transformer 35 having trigger windings 36 and 37 connected through capacitors C1 and C2 and diodes D1 and D2 to the base electrodes of the silicon controlled rectifiers in the same manner as the windings 16 and 17 of the inverters of FIGS. 1 and 2. The transformer 35 operates in a substantially linear mode and has an input winding 39 connected to the excitation winding 33 so as to provide for internal triggering of the silicon controlled rectifiers from the main core 12 in a manner similar to that obtained by the direct connected trigger circuits of FIGS. 1 and 2. The control transformer 35 may be of the cross field control type having a winding 40 which produces a flux orthogonal to the main flux of the transformer for controlling the inductive coupling between the winding 39 and the trigger windings 36 and 37. The winding 40 may be energized from a amplifier A1 which is connected to the control winding 32 of the main core 12 by means of a transformer T and a rectifier bridge circuit comprising rectifiers D4. A frequency responsive L-C circuit including an inductance device 29 and capacitor 30 is connected in circuit with the winding 32 and the primary winding of the transformer T so that the signal voltage applied to the amplifier A1 is responsive to the frequency of switching of the core 12. Hence the winding 40 is energized in accordance with the switching frequency, and deviations thereof change the bias energization of the winding 40 so that the trigger voltages supplied to the base electrodes of the silicon controlled rectifiers SCR1 and SCR2 from the winding 36 and 37 are adjusted to control the firing rate of the rectifiers, and the inverter stabilizes at the normal operating frequency. Means such as a temperature responsive thermistor 42 may be connected in the circuit of a control winding 40 so as to compensate for changes in the temperature of the core 12 and vary the energization of winding 40 and hence regulate the frequency of operation for changes in operating temperature. An additional amplifier A2 may be utilized to control energization of bias windings 27, 28 in accordance with temperature changes sensed by means such as a thermistor 26 connected to control the output of amplifier A2.

Figure 4:
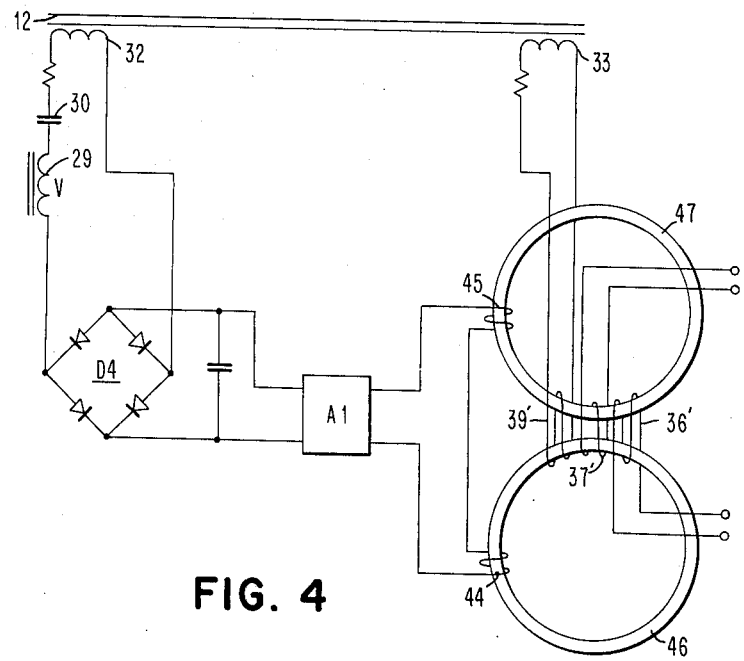
FIG. 4 is a schematic circuit diagram of a modified form of control circuit which can be used with the power supply of FIG. 3.

Referring to FIG. 4 the reference numeral 12 designates the core of the inverter having an excitation control winding 33 and a control winding 32 thereon similar to the corresponding windings shown in FIG. 3. The control winding 32 is connected as before through an inductance device 29 and a capacitance 30 to a bridge of rectifier devices D4 for providing a direct current control voltage which is proportional to the frequency of switching of the core 12. The signal is applied to an amplifier A1.

Instead of utilizing the amplifier as described hereinbefore with the circuit of FIG. 3 for controlling a cross field transformer 35, the amplifier A1 may be connected to a pair of bias control windings 44 and 45 which are wound on saturable cores of, for example, ferrocube or ferrite material 46 and 47 so as to bias the cores in opposite directions. These cores are provided with trigger control windings 36' and 37' which may be connected to the silicon controlled rectifiers SCR1 and SCR2 in a circuit such as shown in FIG. 3 in place of the windings 36 and 37 of FIG. 3. The cores are also provided with an input winding 39' which may be connected to the excitation control winding 33 so that the cores 46 and 47 provide a coupling between the winding 39', 36' and 37' so as to apply trigger pulses to the silicon controlled rectifiers SCR1 and SCR2 from the winding 33 on the main core 12. By utilizing the bias windings 44 and 45 on the cores 46 and 47 controlled by the amplifier A1 through a frequency responsive control circuit such as the series resonant circuit 29–30, the cores 46 and 47 are made to operate in a saturated mode over oppositely disposed minor loop saturation curves variation in the energization of these windings from the amplifier A1 causing the excursions of the flux over these minor loops to change and hence change the switching time of the cores 46 and 47 and the timing of the pulses applied to the silicon controlled rectifiers from the windings 36' and 37', so as to change the switching time of the main core 12 and its switching frequency.

Figure 5:
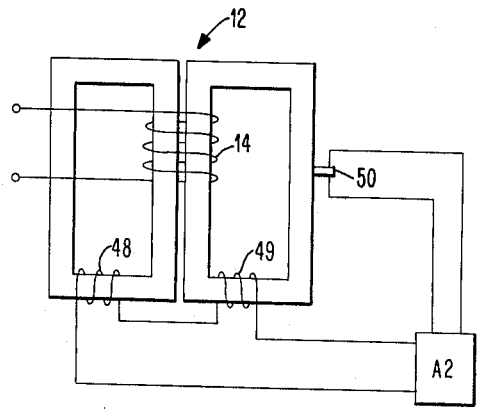
FIG. 5 is a partial schematic circuit diagram showing one method of obtaining a temperature correction, in a power supply such as shown in FIG. 2.

Referring to FIG. 5, a different embodiment of the invention is shown in which temperature compensation is accomplished by utilizing a magnetic core means comprising a pair of cores such as shown in the circuit described in connection with FIG. 2 of the drawings and providing these cores with separate bias control windings 48 and 49 which are controlled from an amplifier A2 which is responsive to a temperature sensitive element 50 such as a thermistor connected to change the operating point of the amplifier A2 in accordance with a change in the temperature of a core means 12. The core means 12 is otherwise connected as shown in the circuit of FIG. 2, only the main winding 14 being shown for purposes of simplification. Operation of the inverter will be substantially the same as described in connection with the inverter of FIG. 2, the amplifier A2 serving to vary the bias energization of the core means by means of the windings 48 and 49 in response to temperature changes sensed by the temperature sensitive device 50 so that compensation is provided for frequency changes occasioned by changes in the operating temperature, thus leaving the amplifier A1 of FIG. 2 to more accurately control the frequency in response to deviations in the source voltage, etc.

Figure 6:
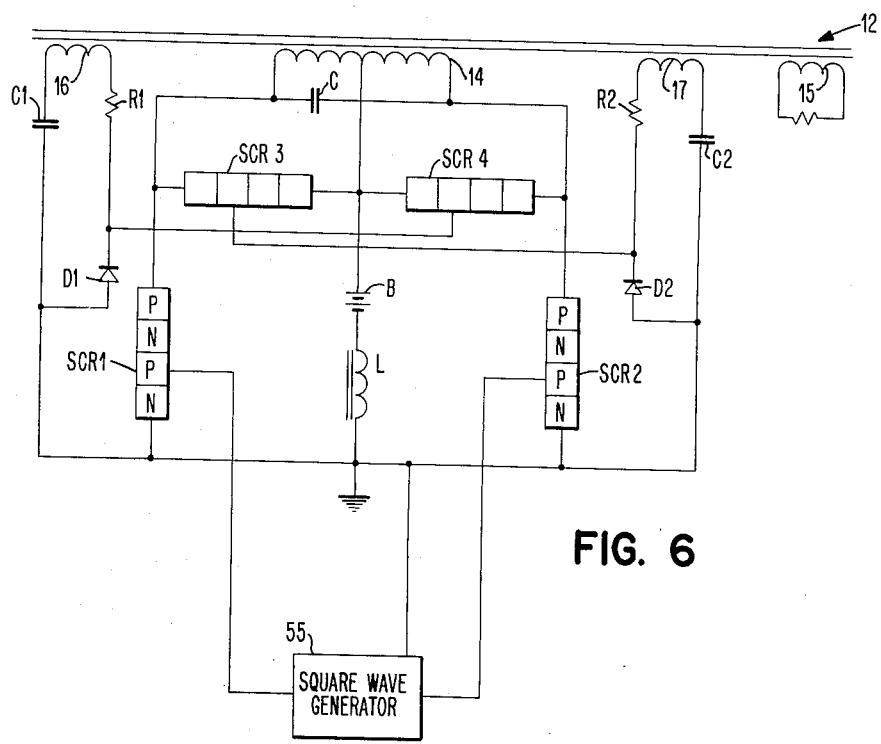
FIG. 6 is a schematic circuit diagram of a power supply embodying the invention in yet another of its forms.

Referring to FIG. 6 it will be seen that a magnetic core means 12 is utilized similar to that described in connection with FIGS. 1 and 2 of the drawings having an input winding 14 which is connected to a source of direct current voltage such as a battery B through an inductance device L by means of silicon controlled rectifiers SCR1 and SCR2 which are connected to opposite ends of the input winding 14. A commutating capacitor C is connected across the input winding 14 in the manner similar to that described in connection with FIGS. 1 and 2 of the drawings.

Instead of utilizing trigger control windings connected directly to provide internal triggering for the silicon controlled rectifiers SCR1 and SCR2, means such as a square wave generator 55 of any suitable type may be connected to the base electrodes of silicon controlled rectifiers SCR1 and SCR2 for alternately switching the controlled rectifiers to connect opposite halves of the winding 14 to the source B. In order to reduce commutation time of the core 12 and consequently reduce the filter capacity to produce a smaller D.C. ripple voltage in the output, silicon controlled rectifiers SCR3 and SCR4 are connected one across each half of the input winding 14. The base electrodes of the controlled rectifiers SCR3 and SCR4 are respectively connected to the trigger control windings 17 and 16 which are utilized in conjunction with capacitors C2 and C1 and diodes D2 and D1 to provide trigger pulses for the rectifiers SCR3 and SCR4.

In operation if silicon controlled rectifier SCR2 is firing, it charges capacitor C to the polarity shown. Silicon controlled rectifiers SCR1, SCR3 and SCR4 are open. When the core 12 is saturated, silicon controlled rectifier SCR4 fires by the internal trigger signals from the capacitor C1 which was charged through D1 and trigger winding 16, and shorts the saturated core inductance. This short circuit permits the capacitor C to discharge rapidly and switch the core and hence the output voltage, thus improving the switching time of the core so that a smaller ripple voltage is produced in the output.

From the above description and accompanying drawings it will be apparent that we have provided a self starting inverter with an initial firing pulse which causes the correct silicon controlled rectifier to fire so as to cause the core to switch. Excellent loading characteristics are obtained since the inverter is self-excited. Inverters according to our embodiment of the invention may be readily started and will continue to operate at no-load, it is also relatively insensitive to the type of the load impedance and will continue to oscillate under extreme dynamic load changes. Since the core operates in a saturated load, the output voltage waveform is relatively independent of the load impedance, being primarily a function of the squarness of the core material.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In magnetic type inverter system,
   (a) magnetic core means having a plurality of windings thereon,
   (b) a pair of electrode controlled switch devices connecting at least one of said windings to a direct current source for energization alternately in opposite senses,
   (c) circuit means connecting the control electrode of each device to a winding on the core means to trigger said devices to so connect said one winding,
   (d) and means including switch means connecting another of said windings to be energized in a predetermined sense prior to energization of said one winding.

2. In a magnetic inverter system,
   (a) magnetic core means having a plurality of windings including a center-tapped input winding,
   (b) a pair of electrode controlled switch devices connecting two sections of the input winding to a D.C. source for energization in opposite senses,
   (c) circuit means connecting the control electrodes of the respective switch devices to different ones of said plurality of windings including a trigger capacitor for each such circuit means,
   (d) switch means connecting yet another of said plurality of windings for energization in a predetermined sense,
   (e) and circuit means including additional switch means operatively connected with said switch means to complete the conection of the switch devices after operation of said switch means.

3. In an inverter system,
   (a) magnetic core means having a plurality of inductively coupled windings thereon,
   (b) a pair of silicon controlled rectifier devices each having a control electrode,
   (c) circuit means including a switch connecting said devices to a D.C. source and to different ones of said windings for effecting energization thereof in opposite senses,
   (d) circuit means including an electrical energy storage device connecting yet another different one of said windings to the control electrode of each device for supplying a trigger pulse to render said device conductive,
   (e) auxiliary switch means operatively connected to said switch means to connect still another one of said windings to the source for predetermining the residual magnetism of the core means,
   (f) and additional circuit means connected in circuit with the control electrode of one of the switch devices and said switch means for applying a starting trigger pulse to said one switch device when said auxiliary switch means is closed.

4. In an inverter,
   (a) a pair of magnetic core devices,
   (b) a plurality of windings inductively coupled on both core devices,
   (c) a pair of electrode-controlled switch devices connected to select ones of said windings and a D.C. source for effecting energization of said windings in opposite senses,
   (d) circuit means including a trigged capacitor connecting a different winding to the control electrode of each device for triggering said device,
   (e) switch means connecting yet another one of said windings to a direct current source to determine the residual magnetism of said core devices,
   (f) a bias winding individual to each core device,
   (g) and circuit means including a frequency sensitive control circuit connected to one of said plurality of windings to control the energization of the bias windings, to regulate the switching frequency of the switch devices.

5. In an inverter,
   (a) magnetic core means,
   (b) a plurality of windings inductively coupled on said core means,
   (c) a pair of silicon controlled rectifier devices each with a control electrode and connected in series with a different one of said windings and a D.C. source for effecting energization of said windings in opposite senses,
   (d) circuit means including a capacitor and a rectifier device connecting another one of said windings to the control electrode of each switch device for applying a trigger pulse thereto,
   (e) switch means connected in series with the switch devices and the source for completing the circuit to the source,
   (f) auxiliary switch means operatively connected with said switch means to momentarily connect another one of said winding to the source prior to operation of said switch means,
   (g) and circuit means including a capacitor and a rectifier device connecting the source and control electrode of one of said controlled rectifier device when said switch means is closed.

6. In an inverter,
   (a) magnetic core means having a plurality of windings including an input winding,
   (b) a pair of silicon controlled rectifier devices disposed to connect the input winding to a direct current source for energization in opposite senses, said silicon controlled rectifiers having control electrodes,
   (c) means including an energy storage device connecting a different one of said windings to the control electrode of each device,
   (d) means including a capacitor connecting the electrode of a predetermined one of the devices to the source,
   (e) and additional circuit means connecting yet another one of said one of plurality of windings to the source to determine the residual magnetism of said core means.

7. In an inverter system,
   (a) magnetic core means,
   (b) a plurality of windings inductively coupled on said core means,
   (c) a pair of silicon controlled rectifier devices selectively operable to connect at least one of said windings to a D.C. source for energization in opposite senses,
   (d) a commutating capacitor connected in shunt with said one winding,
   (e) and means including an electrode controlled switch device connected across said winding means to provide a low impedance discharge path for said commutating capacitor.

8. In an inverter, (a) magnetic core means having a plurality of windings including an input winding,
(b) a pair of electrode controlled switch devices disposed to alternately connect said input winding to a direct current source in opposite senses,
(c) saturable core means having output windings connected to the electrodes of said devices and having an input winding inductively coupled with said magnetic core means,
(d) and means including a frequency sensitive circuit inductively coupled with said saturable core means for applying a variable bias to said saturable means to control switching of said switch devices.

9. In an inverter,
(a) magnetic core means having a plurality of windings,
(b) means including a pair of silicon controlled rectifiers connecting at least one of said windings to a D.C. source for energization alternately in opposite senses,
(c) means including a capacitor connecting a different one of said windings to the control electrode of each of said devices,
(d) means including an amplifier connecting another winding of each device to provide for magnetically biasing the cores in opposite senses,
(e) and means including a temperature sensitive device for controlling said amplifier to regulate the frequency of the inverter.

References Cited by the Examiner

UNITED STATES PATENTS

| | | | |
|---|---|---|---|
| 2,806,963 | 9/1957 | Woll | 323—22 |
| 2,817,804 | 12/1957 | Kurshan | 321—18 |
| 2,965,856 | 12/1960 | Rosel | 321—2 |

LLOYD McCOLLUM, *Primary Examiner.*